United States Patent [19]
Karlsson

[11] Patent Number: 6,055,635
[45] Date of Patent: *Apr. 25, 2000

[54] METHOD AND DEVICE FOR FACILITATING ACCESS TO A MULTITUDE OF ALPHANUMERIC SEQUENCES

[76] Inventor: Leif Karlsson, Lidvägen 5, Vänersborg, Sweden, S-462 61

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,070

[22] PCT Filed: Aug. 24, 1995

[86] PCT No.: PCT/SE95/00955

§ 371 Date: Mar. 14, 1997

§ 102(e) Date: Mar. 14, 1997

[87] PCT Pub. No.: WO96/08806

PCT Pub. Date: Mar. 21, 1996

[30] Foreign Application Priority Data

Sep. 14, 1994 [SE] Sweden ................................. 9403060

[51] Int. Cl.[7] ...................................................... H04K 1/00
[52] U.S. Cl. ............................... 713/184; 380/56; 380/52; 380/26
[58] Field of Search ................. 380/28, 56, 57, 380/58, 59, 55, 51, 23, 24, 25, 52, 26; 283/17, 72, 73, 57; 713/184

[56] References Cited

U.S. PATENT DOCUMENTS

| | | | |
|---|---|---|---|
| 312,665 | 2/1885 | Smith | 380/57 |
| 847,767 | 3/1907 | Harlan | 380/56 |
| 1,311,457 | 7/1919 | Nicolleti | 380/56 |
| 1,657,411 | 1/1928 | Scherbius | 380/52 |
| 2,975,530 | 3/1961 | Lindstein | 380/56 |
| 3,350,800 | 11/1967 | Witt et al. | 283/17 X |
| 4,336,754 | 6/1982 | Loeb | 283/17 X |
| 5,059,052 | 10/1991 | Casper | 402/80 R |
| 5,177,789 | 1/1993 | Covert | 713/184 |
| 5,241,594 | 8/1993 | Kung | 380/4 |
| 5,246,375 | 9/1993 | Goede | 283/73 X |
| 5,265,162 | 11/1993 | Bush et al. | 380/24 |
| 5,317,636 | 5/1994 | Vizcaino | 380/23 |
| 5,321,755 | 6/1994 | Vlaar | 380/56 |
| 5,742,035 | 4/1998 | Kohut | 235/380 |

FOREIGN PATENT DOCUMENTS

| | | |
|---|---|---|
| 164309 | 6/1992 | Denmark . |
| 0382410A2 | 8/1990 | European Pat. Off. . |
| 0546681A1 | 6/1993 | European Pat. Off. . |
| 2261540A | 5/1993 | United Kingdom . |

*Primary Examiner*—Pinchus M. Laufer
*Attorney, Agent, or Firm*—Jacobson, Price, Holman & Stern, PLLC

[57] ABSTRACT

A method and a device for facilitating authorized and simultaneously restraining unauthorized access to a multitude of alphanumeric sequences, for instance for credit cards, code keys and the like. According to the method every correct sequence (e.g. 5533) is encrypted by mathematically manipulating it by means of an encrypting sequence (7221) common to every correct sequence, so that every correct sequence is converted into a fictitious encrypted sequence. The credit card has a carrier (12–16) for carrying and exposing the fictitious sequence. A deciphering of the fictitious sequence is performed by a reversed mathematical manipulation of the fictitious sequence.

8 Claims, 1 Drawing Sheet

METHOD AND DEVICE FOR FACILITATING ACCESS TO A MULTITUDE OF ALPHANUMERIC SEQUENCES

FIELD OF THE INVENTION

This invention relates to a method of facilitating authorized and simultaneously restraining unauthorized access to a multitude of alphanumeric sequences which are each associated with a specific access element such as a credit card, a code key for a door lock, coded equipment or the like. The invention also relates to a device for carrying out the method.

BACKGROUND ART

In today's computerized cashless world, there is an increasing use of access elements in the form of coded cards, for instance bank credit cards, code keys and the like, for enabling access to cash dispensers, petrol pumps, door locks, dator equipments or the like. In order to reduce the risk that any unauthorized person will use the access elements, it is recommended that the authorized person should memorise the alphanumeric sequences but not record them anywhere, or at least store such recorded sequences separately from the access elements.

Memory aiding devices have been proposed, where a possessor of a multitude of different sequences only has to remember one single password, which enables each one of the sequences to be retrieved. Such aiding devices are disclosed in GB-A-2 261 540, DK-B-164 309, EP-A-0 382 410 and EP-A-0 546 681.

The known methods are based upon the use of very bulky patterns of numerals where the correct sequences are hidden among a plurality of other numerals. A separate code key, for instance a slide means or a transparent window means, is then used to expose the correct sequence by use of a password which defines a correct orientation of the code key.

The known aiding devices are bulky and are so cumbersome to use, that they often require that the authorized person has to sit down at a table in order to accurately manage to handle the aiding means and retrieve the correct sequence. For a person standing in the street in a bank cash machine queue it would hardly be possible to readily retrieve the correct sequence by means of such cumbersome aiding means.

SUMMARY OF THE INVENTION

The object of this invention is to propose a method and a device of the kind mentioned by way of introduction, which is easier to use and where the device for carrying out the method is much less bulky.

The invention is based on the teaching that the correct sequences shall be encrypted by a mathematical manipulation by means of an encrypting sequence ("aiding sequence") common to every correct sequence, such that the possessor of the sequences only has to memorise said common encrypting sequence. The encrypted sequence may then be written down on the associated access element (credit card or the like) as a fictitious sequence. This fictitious sequence is of no use for any unauthorized person who is not in possession of the encrypting sequence. When the fictitious sequence is to be decoded, a reversed mathematical manipulation of the encrypting sequence is done by means of the fictitious sequence.

The authorized owner of the sequences has always the fictitious sequence handy, for instance it may be written directly on the access element, and he must only remember the encrypting sequence in order to be able to retrieve the correct sequence.

The aiding means required by this invention only consists of an alphanumeric numeral indicator, which can be designed so small that it may be fastened in a wallet or purse without intruding on other spaces of the wallet.

Further developments of the invention are set forth in the subclaims.

BRIEF DESCRIPTION OF THE DRAWINGS

The invention will be described in further detail by reference to the accompanying drawings which illustrate some embodiments of the invention.

PREFERRED EMBODIMENT

Figure 1:
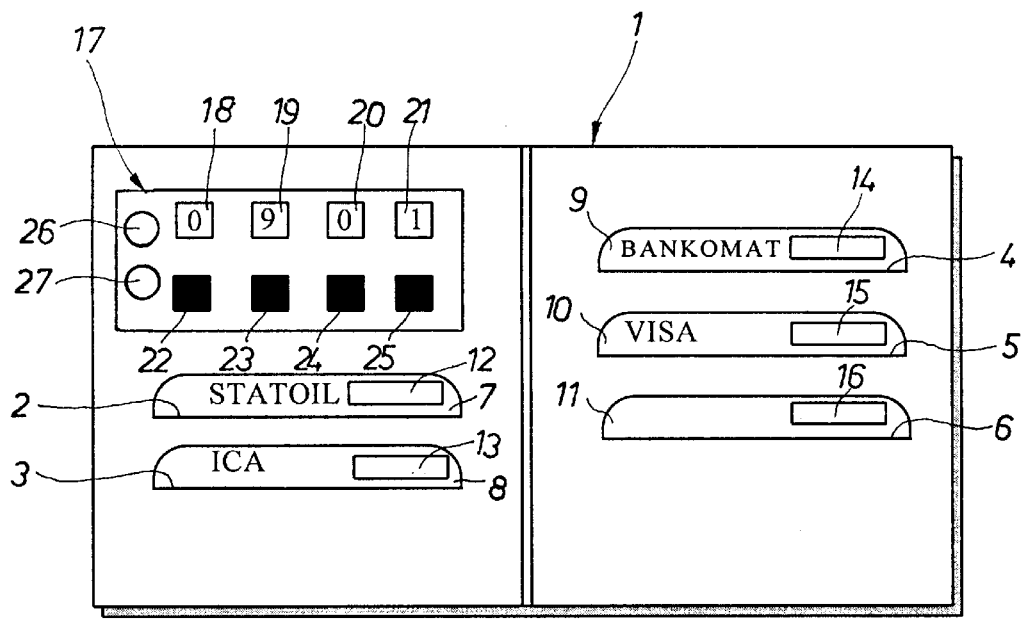
FIG. 1 illustrates a credit card wallet provided with an electronic device embodying features of the invention.

FIG. 1 shows a credit card wallet 1, the inside of which has, in the embodiment shown, five credit card pockets 2–6 for receiving a respective one of five credit cards 7–11. The credit card pockets 2–6 are, in a known way, shallower than the card itself, such that this is only partially insertable into the pocket, such that a portion of the card will project above the pocket. According to an embodiment of the invention this upsticking portion is provided with a carrier means in the form of a user-markable square, i.e. a substrate 12, 13, 14, 15 and 16, respectively, able to carry a fictitious sequence, as will be described below.

An electronic numerical indicator 17, for instance in the form of a data chips card, is fastened in any suitable way to the inside of a portion of the wallet 1. The numerical indicator 17 consists, in its most simple embodiment, of a liquid crystal display having four windows 18–21 each able to present the alphanumeric integers 0–9. A consecutive stepwise feed of the integers in each window 18–21 is performed by means of individual push buttons 22–25 associated with each window. There are also two more push buttons 26 and 27, the function of which will be explained in connection with a modified embodiment.

The method of the invention will now be explained by way of example by reference to the device shown in FIG. 1.

The bank card owner himself chooses an encrypting sequence which is easy to remember for him, e.g. the sequence 7221. Now suppose he has received a credit card with an associated sequence 5533. Then he enters the four numerals 7-2-2-1 into the windows 18–21 by pushing each one of the buttons 22–25 an appropriate number of times. Then he makes a forward stepping of the numerals of the windows until the latter instead show the numerals 5-5-3-3, i.e. the correct credit card sequence. He then observes the number of steppings that he had to make in order to arrive at the numerals 5-5-3-3 starting from the numerals 7-2-2-1. In this case, the number of steppings was 8 for the first numeral, 3 for the second numeral, 1 for the third numeral, and 2 for the fourth numeral. The number of such steppings forms a new sequence consisting of the four numerals 8312 which constitute the encrypted, fictitious sequence. The owner of the credit card can suitably write down this encrypted sequence in a corresponding square 12–16 of the credit card, so that the encrypted sequence will be exposed also when the card has been placed in its associated card pocket.

When the card owner desires to retrieve the correct sequence he must perform the following steps.

He enters the encrypting sequence 7-2-2-1 into the numerical indicator 17. Then he pushes the buttons 22–25 the same number of times as the value of corresponding numerals of the fictitious sequence 8312, i.e. the first button 22 will be pushed 8 times, the second button 3 times, and so on. When these steppings of the numerals of the numerical indicator 17 have been carried out, the windows 18–21 of the latter will show the correct sequence: 5533.

The above-mentioned steppings are always done forwardly, i.e. with increasing value of the numerals for each push on the push buttons, this applies to encrypting and deciphering as well. This may alternatively be said in the following way.

When encrypting the sequence 5533 each one of the numerals of the encrypting sequence 7221 is subtracted from a corresponding one of the numerals of the sequence 5533, any ten digits being omitted:

| | |
|---|---|
| 5533 | (correct sequence) |
| −7221 | (encrypting sequence) |
| 8312 | (fictitious sequence) |

When deciphering the fictitious sequence 8312 each one of the numerals of the fictitious sequence 8312 is added to a corresponding one of the numerals of the encrypting sequence 7221, any ten digits being omitted:

| | |
|---|---|
| 7221 | (encrypting sequence) |
| +8312 | (fictitious sequence) |
| 5533 | (correct sequence) |

Alternatively, the stepping of the push buttons may be arranged in such a way that they are instead stepped backwards for each push on the push buttons. Then, a reversed mathematical operation will be performed, i.e. an addition will be achieved when encrypting, and a subtraction when deciphering.

Thus, the described manipulation of the correct sequences by means of an encrypting sequence will constitute a mathematical, arithmetic manipulation of each numeral of the correct sequence. Other manipulations than arithmetic are conceivable within the scope of the invention.

According to another, more advanced embodiment of the invention, the numerical indicator 17 is programmable in such a way that a mathematical manipulation pattern is prebuilt into a data chips of the numerical indicator. The owner of the credit card does not need to know the structure of this manipulation pattern. When he desires to find one of the fictitious sequences he only needs to enter his own encrypting sequence via the buttons 22–25 and then enter the correct sequence via the same buttons, and the indicator 17 will then automatically show the encrypted fictitious sequence in the windows 22–25. When a deciphering is wanted, he needs, similarly, only to enter the encrypting sequence and then the fictitious sequence, and the indicator will automatically show the correct sequence.

In order to ensure that the indicator 17 knows whether the card owner wishes an encrypting or a deciphering, there are, in this embodiment, two extra buttons 26 and 27. When encrypting a sequence one has first to push the button 26, and when deciphering a sequence one has first to push the button 27. Upon terminated encryption or deciphering, respectively, one has to reset the windows 18–21 to zero by simultaneously pressing the two buttons 26 and 27.

It is very important to always reset the windows 18–21 to zero after any completed encrypting operation, since unauthorized persons may otherwise get into possession of the correct sequence.

Figure 2:
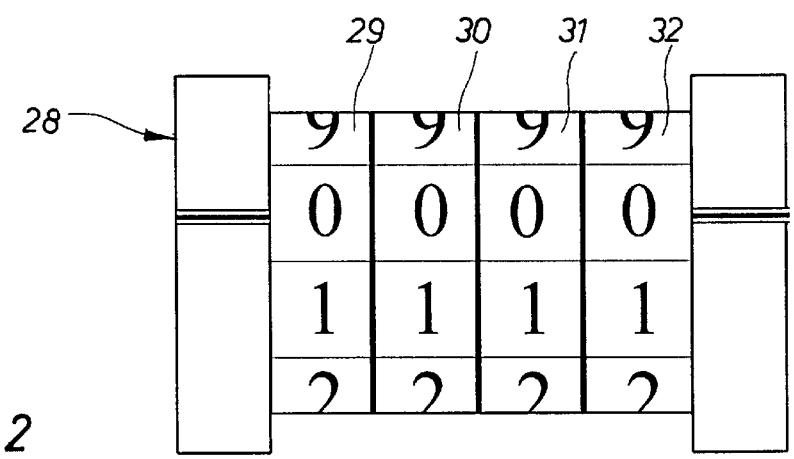
FIG. 2 illustrates a mechanical embodiment of a device embodying features of the invention.

A mechanical embodiment of the device according to the invention is shown in FIG. 2. In this case, the numerical indicator of FIG. 1 has been replaced by a mechanical numeral trundle 28 having four mutually independent alphanumeric numeral wheels 29–32. The numeral trundle 28 is handled in a way similar to the description above in connection with manual stepping of the numerals of the indicator 17.

The numeral trundle 28 may suitably be provided with a key ring, not shown, so that the credit card owner can carry it together with his keys, i. e. have it handy when a fictitious sequence needs to be deciphered.

What is claimed is:

1. A method of facilitating authorized and simultaneously preventing unauthorized access to a plurality of authorization sequences, each authorization sequence associated with a specific access element, the method comprising:

encrypting an authorization sequence by mathematical manipulation using an encrypting sequence to obtain a fictitious sequence, the encrypting sequence being common to all of said plurality of authorization sequences; and, assigning each fictitious sequence to the associated access element;

displaying each fictitious sequence on the associated access element;

entering the fictitious sequence for a desired access element and the encrypting sequence; and deciphering the authorization sequence associated with the desired access element by a reversed mathematical manipulation based upon the entered encrypting sequence and the fictitious sequence to determine the authorization sequence.

2. The method according to claim 1, wherein the step of encrypting comprises subtracting each numeral of the encrypting sequence from a corresponding position in each one of the authorization sequences, and the step of deciphering comprises a corresponding addition of the numerals of the encrypting sequence to a corresponding position of the encrypted sequence.

3. The method according to claim 1, wherein the step of encrypting comprises consecutively entering various numerals of the encrypting sequence into a respective numerical indicator element of a numerical sequence indicator, and then consecutively stepping each such numerical indicator element until the numerical indicator shows said authorization sequence which is to be encrypted, the number of such steppings constituting the desired encrypted sequence.

4. The method according to claim 3, wherein the encrypted sequences are deciphered by consecutively entering the various numerals of the encrypting sequence into a respective one of the numerical indicator elements of the numerical indicator, and then stepping each such numerical indicator element as many times as the value of corresponding numerals of the encrypted sequence, such that the numerical indicator shows the authorization sequence in a deciphered form.

5. A device for carrying out the method of claim 1, comprising an access element having a carrier means for carrying and exposing one of the authorization sequences in encrypted form which is individually associated with the access element, and a sequence numerical indicator for converting the authorization sequence by mathematical manipulation of the authorization sequence, into said encrypted form, and back into a deciphered form.

6. The device according to claim 5, further comprising a wallet which carries said sequence numerical indicator and has pockets into which said access element is partially insertable, said carrier means being located such that the encrypted sequence of each access element is exposed when the access element is inserted into its associated pocket.

7. The method according to claim 1, wherein the step of encrypting comprises adding each numeral of the encrypting sequence to a corresponding position in each one of the authorization sequences, and the step of deciphering comprises a corresponding subtraction of the numerals of the encrypting sequence to a corresponding position of the encrypted sequence.

8. The method of claim 1, wherein the authorization sequence comprises alphanumeric characters.

* * * * *